US012335731B2

(12) United States Patent
Pazhyannur

(10) Patent No.: US 12,335,731 B2
(45) Date of Patent: Jun. 17, 2025

(54) ONBOARDING WIRELESS DEVICES TO PRIVATE NETWORKS

(71) Applicant: Cisco Technology, Inc., San Jose, CA (US)

(72) Inventor: Rajesh S. Pazhyannur, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/313,547

(22) Filed: May 8, 2023

(65) Prior Publication Data

US 2023/0276236 A1  Aug. 31, 2023

Related U.S. Application Data

(63) Continuation of application No. 16/597,341, filed on Oct. 9, 2019, now Pat. No. 11,689,926.

(51) Int. Cl.
| | |
|---|---|
| *H04L 61/10* | (2022.01) |
| *H04L 9/40* | (2022.01) |
| *H04L 61/4511* | (2022.01) |
| *H04W 8/18* | (2009.01) |
| *H04W 12/08* | (2021.01) |
| *H04W 76/10* | (2018.01) |
| *H04W 84/04* | (2009.01) |

(52) U.S. Cl.
CPC ............. *H04W 12/08* (2013.01); *H04L 61/10* (2013.01); *H04L 61/4511* (2022.05); *H04L 63/101* (2013.01); *H04W 8/18* (2013.01); *H04W 76/10* (2018.02); *H04W 84/042* (2013.01)

(58) Field of Classification Search
CPC ....... H04W 12/08; H04W 76/10; H04W 8/18; H04W 84/042; H04L 61/10; H04L 61/1511; H04L 63/101
USPC ............................................................ 726/4
See application file for complete search history.

(56) References Cited

U.S. PATENT DOCUMENTS 8,909,223 B2  12/2014  Abhishek et al.
9,940,141 B2   4/2018  Li et al.
(Continued)

FOREIGN PATENT DOCUMENTS

WO  2007063176 A1  6/2007
WO  2019136044 A1  7/2019

OTHER PUBLICATIONS

CBRS Alliance, "CBRS Network Services Stage 2 and 3 Specification", CBRSA-TS-1002, V2.0.0, Feb. 4, 2019, 52 pages.
(Continued)

*Primary Examiner* — Josnel Jeudy
(74) *Attorney, Agent, or Firm* — Edell, Shapiro & Finnan, LLC

(57) ABSTRACT

A wireless device provides a connection request to an access point for a private network. The connection request includes a standardized identifier that corresponds to an unprovisioned wireless device. The connection response from the access point indicates that the wireless device is provided access to the private network only for communications with a provisioning server. The wireless device provides a provisioning request to the provisioning server and obtains a provisioning response that include an operational profile to enable access to the private network when the wireless device is configured according to the operational profile.

22 Claims, 5 Drawing Sheets

(56) References Cited

U.S. PATENT DOCUMENTS

| | | | |
|---|---|---|---|
| 2002/0075844 A1* | 6/2002 | Hagen | H04L 63/0442 |
| | | | 370/328 |
| 2003/0101246 A1 | 5/2003 | Lahti | |
| 2006/0023657 A1* | 2/2006 | Woodson | H04W 8/18 |
| | | | 370/328 |
| 2008/0065752 A1 | 3/2008 | Ch'ng et al. | |
| 2012/0210001 A1 | 8/2012 | Ryerson et al. | |
| 2013/0163442 A1* | 6/2013 | Livingston | H04W 48/16 |
| | | | 370/255 |
| 2013/0198817 A1 | 8/2013 | Haddad et al. | |
| 2016/0037332 A1* | 2/2016 | Egeler | H04W 4/029 |
| | | | 455/420 |
| 2016/0183169 A1* | 6/2016 | Horn | H04W 48/14 |
| | | | 709/225 |
| 2017/0289788 A1* | 10/2017 | Lalwaney | H04W 8/24 |
| 2018/0007557 A1 | 1/2018 | Lee et al. | |
| 2018/0013798 A1 | 1/2018 | Pallas | |
| 2018/0034718 A1 | 2/2018 | Subramani et al. | |
| 2018/0352505 A1* | 12/2018 | Kreiner | H04W 12/04 |
| 2019/0174314 A1 | 6/2019 | Joseph et al. | |
| 2020/0221369 A1 | 7/2020 | Adjakple et al. | |
| 2021/0112413 A1* | 4/2021 | Pazhyannur | H04W 48/16 |
| 2021/0368342 A1 | 11/2021 | Zhu et al. | |

OTHER PUBLICATIONS

Vahidian, Elaheh, "Evolution of the SIM to eSIM", Jan. 2013, 110 pages.

* cited by examiner

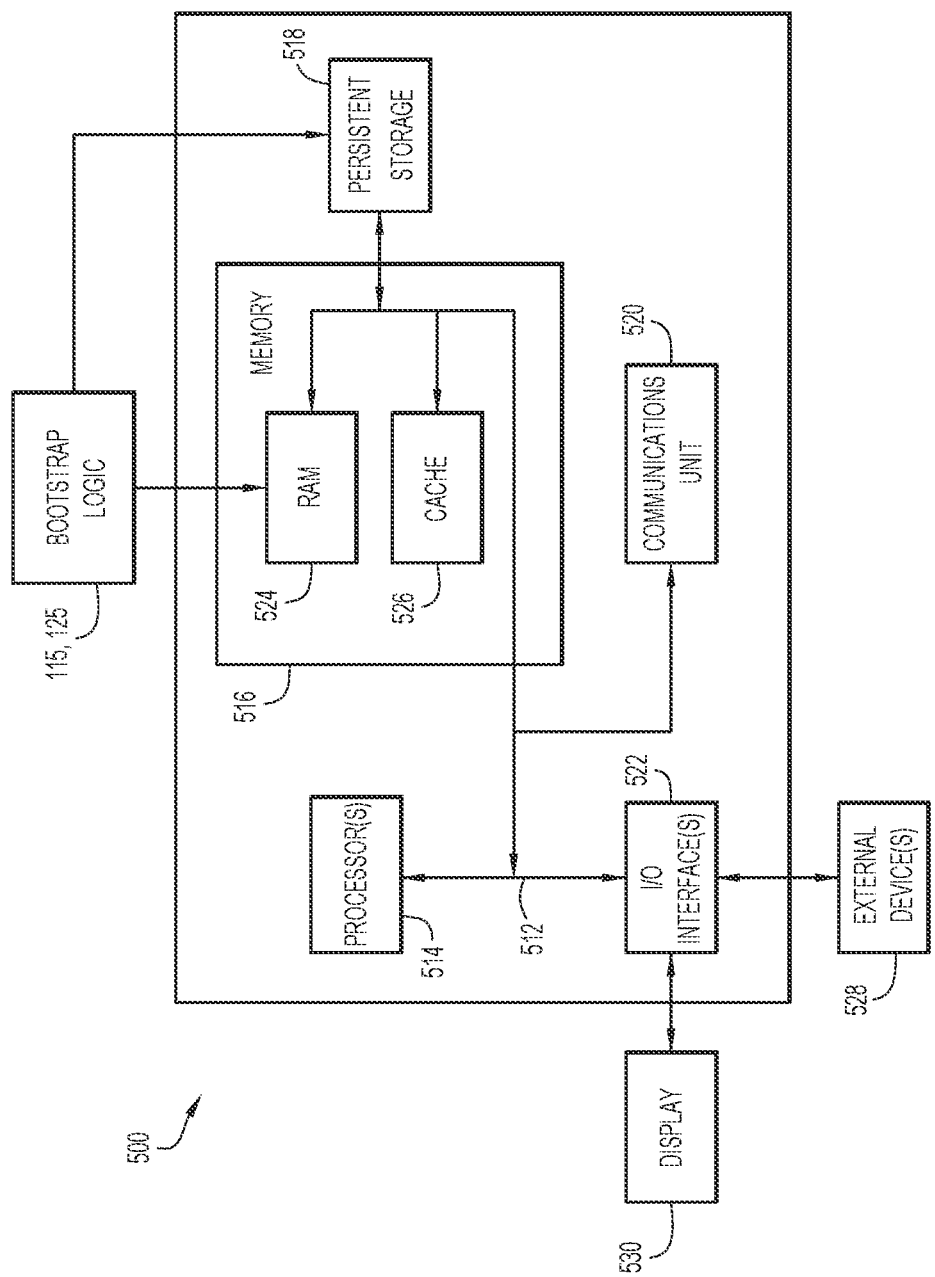

ONBOARDING WIRELESS DEVICES TO PRIVATE NETWORKS

CROSS-REFERENCE TO RELATED APPLICATIONS

This application is a continuation of U.S. application Ser. No. 16/597,341, filed Oct. 9, 2019, now U.S. Pat. No. 11,689,926, the entirety of which is hereby incorporated by reference herein.

TECHNICAL FIELD

The present disclosure relates to provisioning and onboarding devices into a private network.

BACKGROUND

Private networks, such as private Long Term Evolution (LTE) networks using Citizens Broadband Radio Service (CBRS) band, allows private organizations to provide network services to authorized users of the private network. Private LTE networks provide more reliable network access without the interference and congestion inherent in IEEE 802.11 (i.e., Wi-Fi) networks. Some organizations may leverage the lightly/semi-licensed bands of the CBRS spectrum to support various types of applications.

BRIEF DESCRIPTION OF THE DRAWINGS

FIG. 5 illustrates a simplified block diagram of a device that may be configured to perform methods presented herein, according to an example embodiment.

DESCRIPTION OF EXAMPLE EMBODIMENTS

Overview

In accordance with one embodiment, a method is provided for onboarding a wireless device onto a private network. The method includes an access point for a private network obtaining a connection request from a wireless device. The method also includes detecting a standardized identifier that indicates the wireless device is unprovisioned for access to the private network. The method further includes disabling an authentication protocol for granting access to the wireless device on the private network and limiting access of the private network by the wireless device to accessing a provisioning server. The method also includes providing a connection response to the wireless device. The connection response indicates a limited access to the private network.

Example Embodiments

User devices typically use an operational user profile to access a private network. The operational user profile may be deployed in an electronic subscriber identity module (eSIM) by a provisioning server associated with the private network operator. The provisioning server (e.g., a Subscription Management Data Preparation (SM-DP) platform) is typically accessed via either a side channel (e.g., IEEE 802.11, Wi-Fi®, Bluetooth®, etc.) or a bootstrapping profile provided by a Mobile Network Operator (MNO). The bootstrapping profile may enable the user device to obtain a network address and contact an SM-DP associated with the private network operator, which deploys an operational profile in the eSIM of the user device. However, certain limited connectivity devices (e.g., Internet of Things (IoT) devices) may not be configured to access a side channel, such as Wi-Fi or Bluetooth, and may not have a MNO to provide a bootstrapping profile. The techniques described herein provide for onboarding such limited connectivity devices, such as wireless IoT devices, using a standardized bootstrapping profile that is not associated with any MNO.

Figure 1:
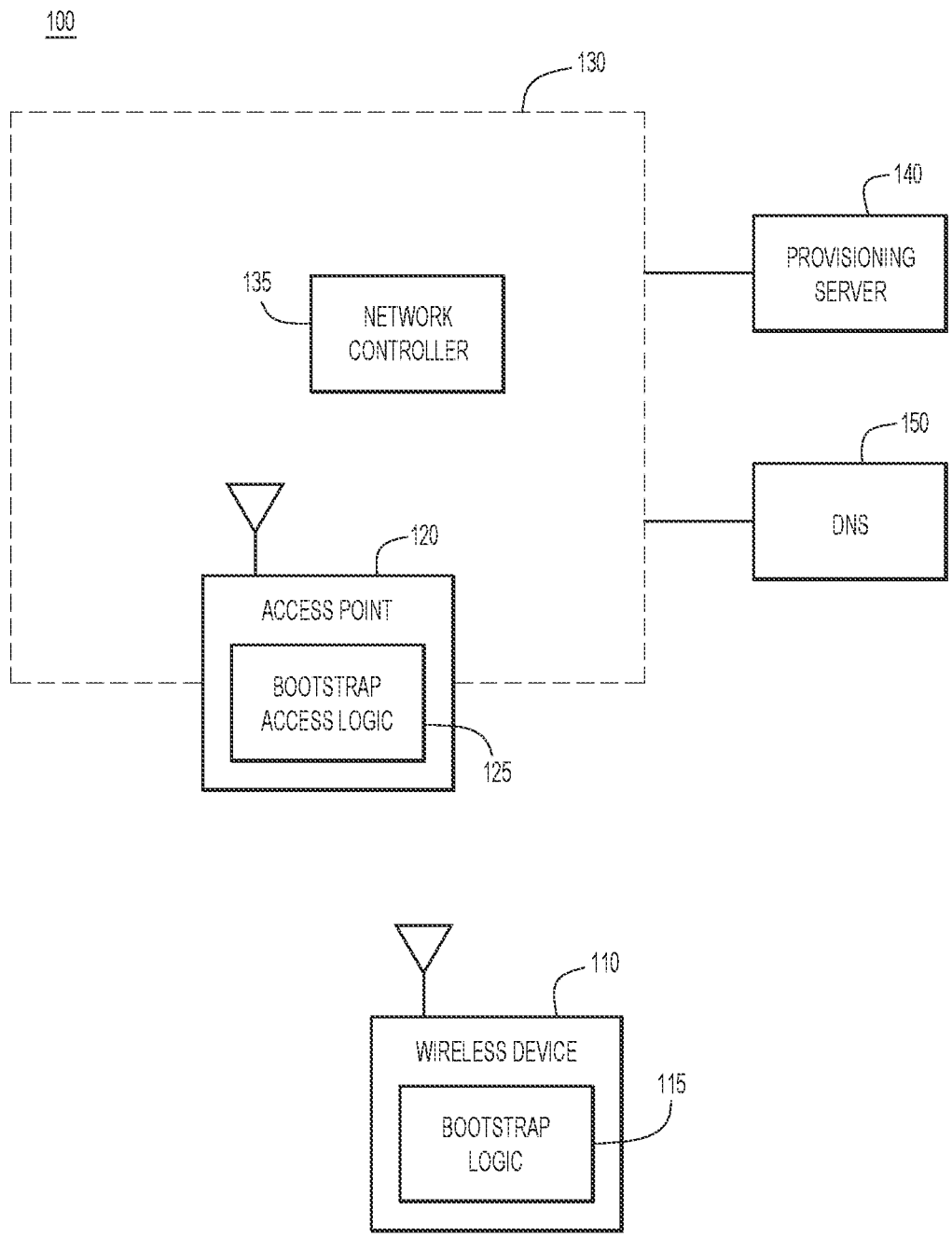
FIG. 1 is a simplified block diagram of an onboarding system configured to connect wireless devices to a private network, according to an example embodiment.

Referring now to FIG. 1, an onboarding system 100 is described for onboarding a wireless device 110 into a private network. The wireless device 110 includes bootstrap logic 115 configured to enable the wireless device 110 to wirelessly attach to an access point 120. The access point 120 includes bootstrap access logic 125 configured to enable the wireless device 110 access a private network 130 through the access point 120. The private network 130 may comprise a plurality of network elements including one or more access points (e.g., access point 120), a network controller 135, and one or more network switches or routers (not shown). The private network 130 may provide attached computing devices (e.g., wireless device 110) with access to additional computing services (e.g., internet access) through the network 130. The network controller 135 is configured to control network traffic within the private network 130, and may be a stand-alone device or integrated with a network element of the private network 130.

The private network 130 is connected to a provisioning server 140 that is configured to provide operational profiles to user devices. The operational profiles allow the user devices to access the private network 130 as well as any additional services provided by the operator of the private network 130, through the private network 130. Additionally, a Domain Name System (DNS) server 150 is connected to the private network 130. The DNS server 150 allows devices connected to the private network 130 to resolve domain names to network addresses, and may be connected to the private network 130 through additional network elements (e.g., an Internet connection).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In one example, the network 130 may be a private LTE network that provides access to resources defined by the private network operator. The private LTE network may allow user equipment (UE) devices (e.g., wireless device 110) to attach to the private LTE network via an evolved Node B (eNB), such as access point 120. The private LTE network may be provided over the CBRS radio band, with the access point 120 acting as a Citizens Broadband Radio Service Device (CBSD). In another example, the network 130 may be Next Generation (i.e., 5G) core network that provides access to wireless devices (e.g., wireless device 110) via a next generation Node B (gNB), such as access point 120.

In one example, the bootstrap logic 115 in the wireless device 110 includes a standardized identifier that has been predetermined to indicate a provisioning profile. For instance, the standardized identifier may be at least one predetermined Public Land Mobile Network (PLMN) Identifier (PLMN-ID) along with at least one predetermined International Mobile Subscriber Identifier (IMSI). The predetermined range of PLMN-ID and IMSI values may be codified in an industry standard to function for private networks (e.g., network 130) to provide limited access to wireless devices (e.g., wireless device 110) using one of the predetermined PLMN-ID and IMSI values.

Alternatively, the bootstrap logic 115 may configure the wireless device 110 to send a connection request with a predefined attach type as the standardized identifier codified in an industry standard. For instance, a UE may attach to an eNB by sending an attach request with an attach type value of "provisioning" to indicate that the UE (e.g., wireless device 110) is attempting to connect to the eNB (e.g., access point 120) with a provisioning profile instead of an operational profile.

User profiles, such as eSIM profiles are typically organized into provisional profiles and operational profiles. The Global System for Mobile communication Association (GSMA) does not specify in detail the difference between the two types of user profiles other than stating that the provisioning profile is used for management of operational profiles.

The bootstrap access logic 125 in the access point detects the standardized identifier (e.g., the predetermined PLMN-ID and IMSI, or the predefined attach type) and configures the access point 120 to allow the wireless device 110 to connect to the network 130 in order to obtain an operational profile. The bootstrap access logic 125 may configure the access point 120 to communicate with the network controller 135 and/or other network elements in the private network 130 to limit the access of the wireless device 110 to services (e.g., provisioning server 140, DNS server 150, etc.) used in obtaining an operational profile for the wireless device 110. In one example, the network controller 135 may implement one or more access control lists (ACLs) that drop any network traffic to/from the wireless device 110 if the network traffic is not from/to the provisioning server 140 or the DNS server 150.

Figure 2:
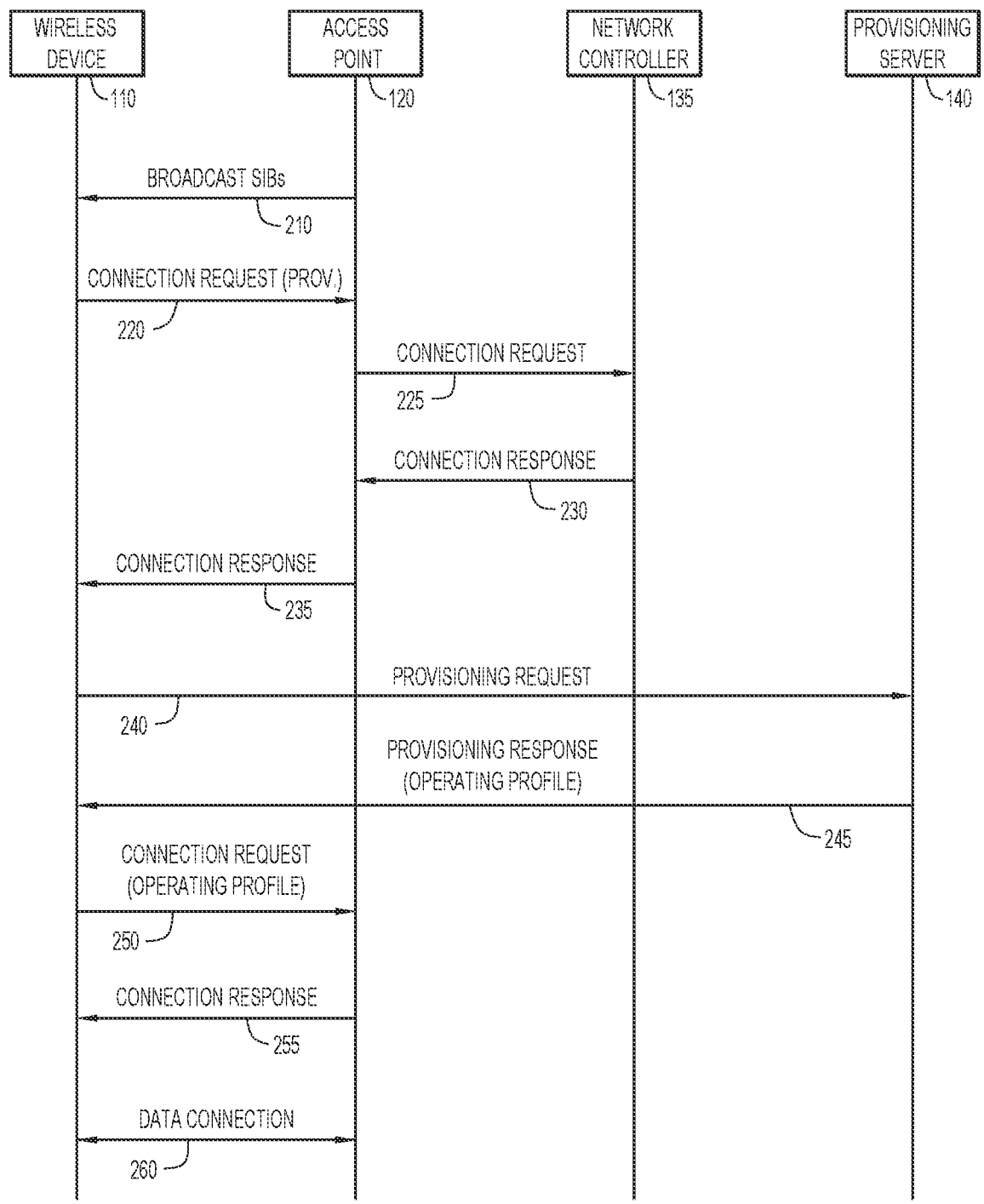
FIG. 2 is a message flow diagram illustrating a wireless device onboarding onto a private network, according to an example embodiment.

Referring now to FIG. 2, with continued reference to FIG. 1, a message flow diagram is shown as an example of a wireless device 110 being provisioned for access to a private network according to the techniques described herein. Initially, the access point 120 is configured to support a standardized identifier for a provisioning profile. In one example, the access point 120 may be configured with a predetermined PLMN-ID and range of IMSI values that are standardized to identify a provisioning profile. The access point 120 broadcasts System Information Blocks (SIBs) with information enabling any nearby wireless devices (e.g., wireless device 110) to attempt to connect to the access point 120. The access point 120 may broadcast a predetermined PLMN-ID that has been standardized as a provisioning profile in the SIBs broadcasted at 210.

The wireless device 110 sends a connection request 220 to the access point 120 indicating that the wireless device 110 is using a provisioning profile. In one example, the connection request 220 may include a request to access the provisioning PLMN-ID that is broadcast by the access point 120 at 210. Alternatively, the connection request 220 may include a field identifying the attach type of the connection request 220 as being "provisioning."

The access point 120 forwards the connection request 225 to the network controller 135 of the network 130 to determine whether the connection request 220 can be accepted. In one example, the access point 120 detects the standardized identifier indicating the provisioning profile in the connection request 220 and provides the provisioning profile to the network controller 135. Alternatively, the access point 120 may directly forward the connection request 220 to the network controller 135 to enable the network controller 135 to detect the standardized identifier of the provisioning profile.

The provisioning profile causes the network controller 135 to disable authentication protocols for the connection request 225 and generate a connection response 230 that allows the wireless device 110 limited access to the network 130. In one example, the network controller 135 installs ACLs that selectively drop network traffic to/from the wireless device 110 to limit the access to the network 130. However, the ACLs allow network traffic that is required for the wireless device 110 to obtain an operational profile, such as network traffic directed to/from a provisioning server 140. The network controller 135 sends the connection response 230 to the access point 120, and the access point 120 forwards the connection response 230 as connection response 235 to the wireless device 110.

With the connection to the access point 120 implemented with the provisioning profile at the wireless device 110, the wireless device 110 sends a provisioning request 240 to the provisioning server 140. In one example, the wireless device 110 may first discover the network address of the provisioning server 140 through a DNS lookup (not shown in FIG. 2). The provisioning server 140 provides an operational profile to the wireless device 110 in the provisioning response 245. In one example, the provisioning request 240 and the provisioning response 245 are formatted according to a Remote SIM Provisioning (RSP) protocol.

After receiving the operational profile from the provisioning response 245, the wireless device 110 may reboot to fully install the operational profile. The wireless device 110 sends a new connection request 250, including the installed operational profile, to the access point 120. The access point 120 verifies and authenticates the operational profile and completes the connection with a connection response 255. After processing the connection response 255, the wireless device 110 may initiate a data connection 260 to the network 130 through the access point 120.

Figure 3:
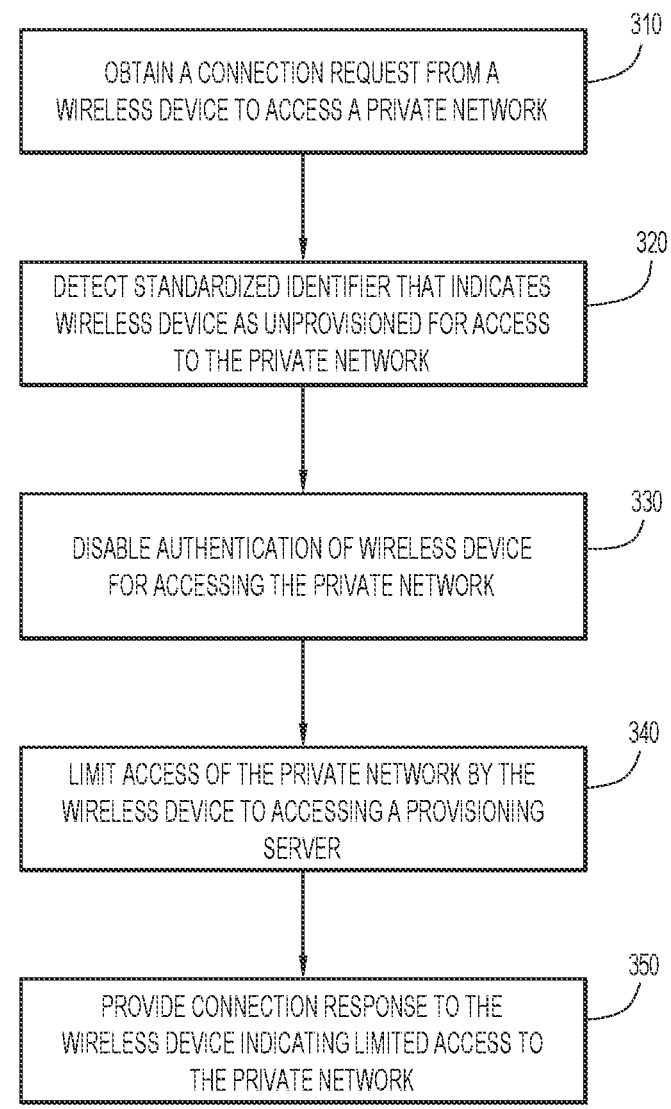
FIG. 3 is a flowchart illustrating operations of an access point in onboarding a wireless device, according to an example embodiment.

Referring now to FIG. 3, a flowchart is shown of operations performed at an access point (e.g., access point 120) in a process 300 for onboarding a wireless device to a private network (e.g., a private LTE network on a CBRS band). Again, reference is also made to FIG. 1 in connection with the description of FIG. 3. At 310, the access point obtains a connection request from a wireless device to access a private network. In one example, the private network may be a private LTE network, and the connection request may be an attach request from a UE sent to an eNB access point. At 320, the access point detects a standardized identifier that indicates the wireless device as unprovisioned for access to the private network. In one example, the standardized identifier may by a PLMN-ID and IMSI within a range of values that are identified in an industry standard as being dedicated to a provisioning profile. Alternatively, the connection request may indicate a predefined attach type (e.g., attach type=provisioning) that has been identified in an industry standard to belong to a provisioning profile.

At 330, the access point disables an authentication protocol for granting access to the private network. In one example, the access point is instructed to disable the authentication protocol by a network controller of the private network. At 340, the access point limits access of the private network for the wireless device to accessing a provisioning server. In one example, the access point sets up ACLs that drop any network traffic to/from the wireless device that is not directed from/to the provisioning server. Alternatively, the access point may allow the wireless device access to a limited set of support services (e.g., a DNS server, a Dynamic Host Configuration Protocol (DHCP) server, etc.) that enable the wireless device to communicate with the provisioning server. At 350, the access point provides a connection response to the wireless device indicating that the wireless device has limited access to the private network based on the provisioning profile from the connection request.

In one example, the access point may be configured to broadcast a predetermined PLMN-ID as a provisioning profile identifier and at least one additional PLMN-ID available for wireless devices with an operational profile. The operator of the private network may configure a Home Subscriber Server (HSS) with keys for a range of predefined IMSI values that are defined to be used temporarily for onboarding devices in private LTE networks. Additionally, the HSS is provisioned with keys corresponding to the operational profile that is installed in the wireless device by the provisioning server.

Figure 4:
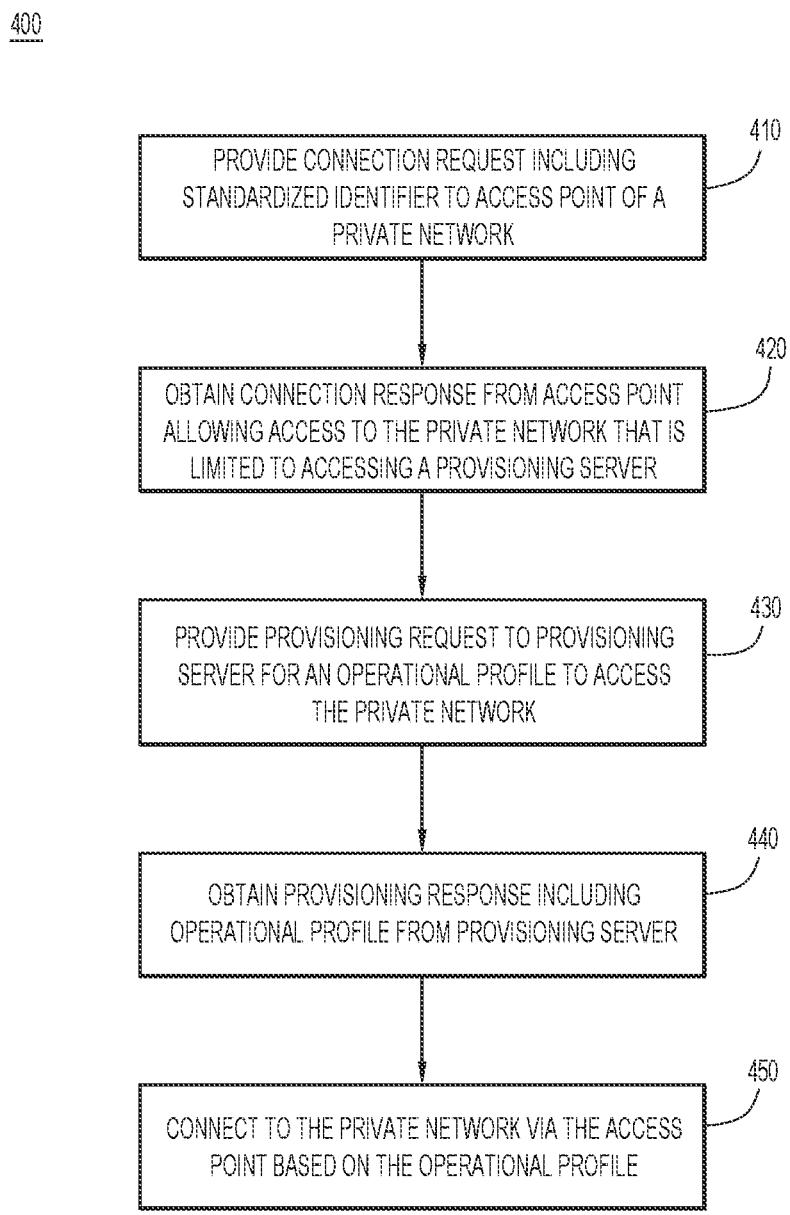
FIG. 4 is a flowchart illustrating operations of a wireless device onboarding onto a private network, according to an example embodiment.

Referring now to FIG. 4, a flowchart is shown for operations performed at a wireless device (e.g., wireless device 110) in a process 400 for onboarding the wireless device into a private network. At 410, the wireless device provides a connection request to an access point for a private network. The connection request includes a standardized identifier corresponding to a provisioning profile. In one example, the standardized identifier may include a well-known PLMN-ID defined by an industry standard (e.g., defined by the CBRS Alliance) to be used for onboarding devices into private LTE networks. The wireless device may also be configured with at least one IMSI value selected from a range of IMSI values that have been defined by an industry standard as temporary IMSI values for onboarding to private LTE networks. The wireless device may be further configured with a well-known and fixed key associated with the temporary IMSI value(s) and the provisioning PLMN-ID. Alternatively, the standardized identifier may be a predefined value for a field in the connection request, such as an attach type of "provisioning" in an LTE attach request.

At 420, the wireless device obtains a connection response from the access point allowing limited access to the private network. The limited access allows the wireless device to access a provisioning server (e.g., an SM-DP+) to obtain an operational profile for the private network. In one example, the wireless device may access a DNS server to resolve the domain of the provisioning server.

At 430, the wireless device provides a provisioning request to the provisioning server to obtain an operational profile for the private network. At 440, the wireless device obtains a provisioning response from the provisioning server that includes an operational profile. In one example, the provisioning server installs the operational profile on the wireless device through a Remote SIM Provisioning protocol. At 450, the wireless device connects to the private network via the access point based on the operational profile.

In one example, the wireless device includes an Embedded Universal Integrated Circuit Card (EUICC) with a provisioning profile as the standardized identifier. The provisioning profile may be defined by an industry standard to include: a well-known PLMN-ID assigned to be an onboarding PLMN-ID for private networks, an IMSI value that is selected from a predefined range of IMSI values assigned to be used for onboarding into private networks, and a well-known and fixed key.

In another example, when the wireless device powers on, the wireless device detects that there is no operational profile installed, but does have a provisioning profile. The wireless device extracts the provisioning PLMN-ID from the provisioning profile and searches for access points broadcasting the provisioning PLMN-ID. The wireless device attaches to the provisioning PLMN-ID, which allows the wireless device to discover a provisioning server (e.g., an SM-DP+) and connect to the provisioning server. The provisioning server downloads an operational profile to the wireless device. The wireless device may reboot and discover the operational profile, which allows the wireless device to connect to the private network.

Referring now to FIG. 5, a hardware block diagram illustrates a computing device 500 that may perform the functions of any of the servers or computing or control entities (e.g., wireless device 110, access point 120, network controller 135, provisioning server 140, etc.) referred to herein in connection with the onboarding system described herein. It should be appreciated that FIG. 5 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media. Instructions for the bootstrap logic 115 and/or bootstrap access logic 125 may be stored in memory 516 or persistent storage 518 for execution by processor(s) 514.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface units, such as network interface cards. Communications unit 520 may provide communications through the use of either or both physical and wireless communications links.

I/O interface(s) 522 allows for input and output of data with other devices that may be connected to computer device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to user identities or credentials). The database system may be included within or coupled to the server and/or client systems. The database systems and/or storage structures may be remote from or local to the computer or other processing systems, and may store any desired data (e.g., data relating to user authentication/authorization or credentials).

The present embodiments may employ any number of any type of user interface (e.g., Graphical User Interface (GUI), command-line, prompt, etc.) for obtaining or providing information (e.g., data relating to user authentication/authorization or credentials), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In summary, the techniques presented herein enable limited functionality devices (e.g., IoT devices) with eSIM profiles to onboard onto private LTE networks, without requiring a separate side channel (e.g., Wi-Fi or Bluetooth). A standardized identifier that is assigned by an industry standard enables the private network to provide limited access for onboarding devices without requiring further authentication from the device. The standardized identifier may be a predefined PLMN-ID and IMSI assigned to be used temporarily for onboarding onto private networks. For instance, the eSIM of a device may be programmed with a provisioning profile that is configured to connect to networks with a predetermined PLMN-ID. Alternatively, the standardized identifier may be a predefined value of a field in the connection request.

Once the onboarding device has established a connection with limited access based on the provisioning profile, the onboarding device connects to an SM-DP+, which installs an operational profile on the eSIM of the onboarding device.

In one form, a method is provided for onboarding a wireless device onto a private network. The method includes an access point for a private network obtaining a connection request from a wireless device. The method also includes detecting a standardized identifier that indicates the wireless device is unprovisioned for access to the private network. The method further includes disabling an authentication protocol for granting access to the wireless device on the private network and limiting access of the private network by the wireless device to accessing a provisioning server. The method also includes providing a connection response to the wireless device. The connection response indicates a limited access to the private network.

In another form, an apparatus comprising a network interface, a wireless interface, and a processor is provided. The network interface is configured to communicate with a plurality of computing devices across one or more networks. The wireless interface is configured to wirelessly communicate with a wireless device. The processor is configured to obtain from the wireless device via the wireless interface, a connection request for access to a private network. The processor is also configured to detect a standardized identifier that indicates the wireless device is unprovisioned for access to the private network. The processor is further configured to disable an authentication protocol for grating access to the wireless device one the private network and limit access of the private network by the wireless device to accessing a provisioning server. The processor is also configured to cause the wireless interface to provide a connection response to the wireless device that indicates limited access to the private network.

In yet another form a non-transitory computer readable storage media is provided that is encoded with instructions that, when executed by a processor of an access point for a private network, cause the processor to obtain a connection request from a wireless device and detect a standardized identifier that indicates the wireless device is unprovisioned for access to the private network. The instructions also cause the processor to disable an authentication protocol for granting access to the wireless device on the private network and limit access of the private network by the wireless device to accessing a provisioning server. The instructions further cause the processor to provide a connection response to the wireless device indicating limited access to the private network.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
providing a connection request from a wireless device to an access point for a private network, the connection request including a standardized identifier with a predetermined value defined in an industry standard to correspond to an unprovisioned wireless device;
obtaining a connection response from the access point, the connection response indicating that the wireless device is provided access to the private network only for communicating with a provisioning server;
providing a provisioning request to the provisioning server;
obtaining a provisioning response from the provisioning server via the access point, the provisioning response including an operational profile to enable access to the private network, wherein the operational profile is obtained based on an access control list configured to limit access of the wireless device to the private network but still allow network traffic in order for the wireless device to obtain the operational profile; and
configuring the wireless device according to the operational profile.

2. The method of claim 1, further comprising connecting to the private network via the access point based on the operational profile.

3. The method of claim 2, wherein connecting to the private network via the access point based on the operational profile comprises providing a new connection request to the access point, the new connection request identifying the operational profile.

4. The method of claim 1, wherein the predetermined value for the standardized identifier comprises a Public Land Mobile Network Identifier (PLMN-ID) assigned in the industry standard to be a provisioning PLMN-ID.

5. The method of claim 1, wherein providing the connection request with the predetermined value for the standardized identifier comprises providing the connection request with a predetermined attach type of the connection request.

6. The method of claim 1, wherein providing the provisioning request to the provisioning server includes resolving a domain name of the provisioning server through the private network.

7. The method of claim 1, wherein configuring the wireless device according to the operational profile comprises allowing the provisioning server to configure the wireless device according to a Remote Subscriber Identity Module (SIM) Provisioning protocol.

8. An apparatus comprising:
a wireless interface configured to wirelessly communicate with an access point for a private network; and
a processor coupled to the wireless interface, the processor configured to:
cause the wireless interface to provide a connection request to the access point, the connection request including a standardized identifier with a predetermined value defined in an industry standard to correspond to an unprovisioned wireless device;
obtain a connection response from the access point, the connection response indicating that the apparatus is provided access to the private network only for communicating with a provisioning server;
cause the wireless interface to provide a provisioning request to the provisioning server through the access point;
obtain a provisioning response from the provisioning server via the access point, the provisioning response including an operational profile to enable access to the private network, wherein the operational profile is obtained based on an access control list configured to limit access of the apparatus to the private network but still allow network traffic in order for the apparatus to obtain the operational profile; and configure the apparatus according to the operational profile.

9. The apparatus of claim 8, wherein the processor is further configured to cause the wireless interface to connect to the private network via the access point based on the operational profile.

10. The apparatus of claim 9, wherein the wireless interface in configured to connect to the private network via the access point based on the operational profile by providing a new connection request to the access point, the new connection request identifying the operational profile.

11. The apparatus of claim 8, wherein the predetermined value for the standardized identifier comprises a Public Land Mobile Network Identifier (PLMN-ID) assigned in the industry standard to be a provisioning PLMN-ID.

12. The apparatus of claim 8, wherein the wireless interface is configured to provide the connection request with the predetermined value for the standardized identifier by providing the connection request with a predetermined attach type of the connection request.

13. The apparatus of claim 8, wherein the processor is further configured to resolve a domain name of the provisioning server through the private network.

14. The apparatus of claim 8, wherein configuring the apparatus according to the operational profile comprises the processor allowing the provisioning server to configure the apparatus according to a Remote Subscriber Identity Module (SIM) Provisioning protocol.

15. One or more non-transitory computer readable storage media encoded with instructions that, when executed by a processor of a wireless device, cause the processor to:

provide a connection request to an access point for a private network, the connection request including a standardized identifier with a predetermined value defined in an industry standard to correspond to an unprovisioned wireless device;

obtain a connection response from the access point, the connection response indicating that the wireless device is provided access to the private network only for communicating with a provisioning server;

provide a provisioning request to the provisioning server;

obtain a provisioning response from the provisioning server via the access point, the provisioning response including an operational profile to enable access to the private network, wherein the operational profile is obtained based on an access control list configured to limit access of the wireless device to the private network but still allow network traffic in order for the wireless device to obtain the operational profile; and configure the wireless device according to the operational profile.

16. The one or more non-transitory computer readable storage media of claim 15, further comprising instructions operable to cause the processor to connect to the private network via the access point based on the operational profile.

17. The one or more non-transitory computer readable storage media of claim 16, further comprising instructions operable to cause the processor to connect to the private network via the access point based on the operational profile by providing a new connection request to the access point, the new connection request identifying the operational profile.

18. The one or more non-transitory computer readable storage media of claim 15, wherein the predetermined value for the standardized identifier comprises a Public Land Mobile Network Identifier (PLMN-ID) assigned in the industry standard to be a provisioning PLMN-ID.

19. The one or more non-transitory computer readable storage media of claim 15, further comprising instructions operable to cause the processor to provide the connection request with the predetermined value for the standardized identifier by providing the connection request with a predetermined attach type of the connection request.

20. The one or more non-transitory computer readable storage media of claim 15, further comprising instructions operable to cause the processor to resolve a domain name of the provisioning server through the private network.

21. The method of claim 1, further comprising:

configuring the wireless device according to a temporary International Mobile Subscriber Identifier (IMSI) value selected from a range of IMSI values that have been defined by an industry standard as temporary IMSI values for onboarding to private Long Term Evolution (LTE) networks; and configuring the wireless device according to a fixed key associated with the temporary IMSI value and the predetermined value for the standardized identifier.

22. The method of claim 1, wherein the access point is configured with a predetermined Public Land Mobile Network Identifier (PLMN-ID) and a range of International Mobile Subscriber Identifier (IMSI) values that are standardized to identify a provisioning profile.

* * * * *